(12) United States Patent
Filart et al.

(10) Patent No.: US 10,893,414 B1
(45) Date of Patent: Jan. 12, 2021

(54) SELECTIVE ATTESTATION OF WIRELESS COMMUNICATIONS

(71) Applicant: T-Mobile USA, Inc., Bellevue, WA (US)

(72) Inventors: Homer Nicolas B. Filart, Renton, WA (US); Dinko Dinkov, Kirkland, WA (US); Jose R. Mendoza, Jr., Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/594,406

(22) Filed: Oct. 7, 2019

(51) Int. Cl.
*H04W 12/06* (2009.01)
*H04L 9/32* (2006.01)
*H04L 29/06* (2006.01)

(52) U.S. Cl.
CPC .......... *H04W 12/06* (2013.01); *H04L 9/3268* (2013.01); *H04L 65/1006* (2013.01); *H04L 65/1016* (2013.01)

(58) Field of Classification Search
CPC .............. H04W 12/06; H04W 12/004; H04W 12/1008; H04W 12/1204; H04W 12/1208; H04L 9/3268; H04L 65/1006; H04L 65/1016; H04L 9/0894; H04L 63/08; H04L 63/0838; H04L 63/0861; H04L 63/0876; H04L 63/126; H04L 63/1433; H04L 63/1483; H04L 65/1076; H04L 65/1079; H04L 9/0662; H04L 9/30; H04L 9/3213; H04L 9/3231; H04L 9/3247; H04L 29/06; H04L 9/08; H04L 9/32; H04M 3/42042; H04M 2203/551; H04M 2203/6027; H04M 2203/6045; H04M 3/42059; H04M 3/436; H04M 3/42

See application file for complete search history.

(56) References Cited

U.S. PATENT DOCUMENTS

| | | | |
|---|---|---|---|
| 10,554,821 B1 * | 2/2020 | Koster | H04M 3/436 |
| 10,601,986 B1 * | 3/2020 | Botner | H04L 65/1069 |
| 2011/0265153 A1 * | 10/2011 | Guccione | G06F 21/36 726/5 |
| 2012/0190325 A1 * | 7/2012 | Abu-Hakima | H04W 4/90 455/404.2 |
| 2018/0324297 A1 * | 11/2018 | Kent | H04W 12/1208 |

(Continued)

*Primary Examiner* — Nathan S Taylor
(74) *Attorney, Agent, or Firm* — Han Santos, PLLC; Gloria Steinberg

(57) ABSTRACT

The present disclosure describes techniques for selective attestation of a wireless communication session between an originating device and destination device. Attestation of the originating device identity depends in part on determining that the destination network associated with the destination device deploys a STIR/SHAKEN framework for end-to-end authentication and assertion of a telephone identity. This disclosure describes techniques to verify that the destination network has deployed the STIR/SHAKEN framework based on the administrative operator carrier number (AOCN) or operator carrier number (OCN) of the destination network. In response to determining the destination network has deployed the STIR/SHAKEN framework, a carrying node is configured to selectively generate instructions to include an attestation of an identity of the originating device in the SIP INVITE message sent to the destination network.

20 Claims, 6 Drawing Sheets

(56) References Cited

U.S. PATENT DOCUMENTS

| | | | | |
|---|---|---|---|---|
| 2018/0352417 A1* | 12/2018 | Butler | ................ | H04W 8/10 |
| 2019/0068594 A1* | 2/2019 | Sarwar | ................ | H04L 63/0838 |
| 2019/0068783 A1* | 2/2019 | Archer | ................ | H04M 3/541 |
| 2020/0028690 A1* | 1/2020 | Barakat | ................ | H04L 9/3247 |
| 2020/0153959 A1* | 5/2020 | Scivicque | ................ | H04L 9/30 |
| 2020/0221302 A1* | 7/2020 | Filart | ................ | H04M 3/42059 |
| 2020/0252503 A1* | 8/2020 | Li | ................ | H04L 65/1053 |

\* cited by examiner

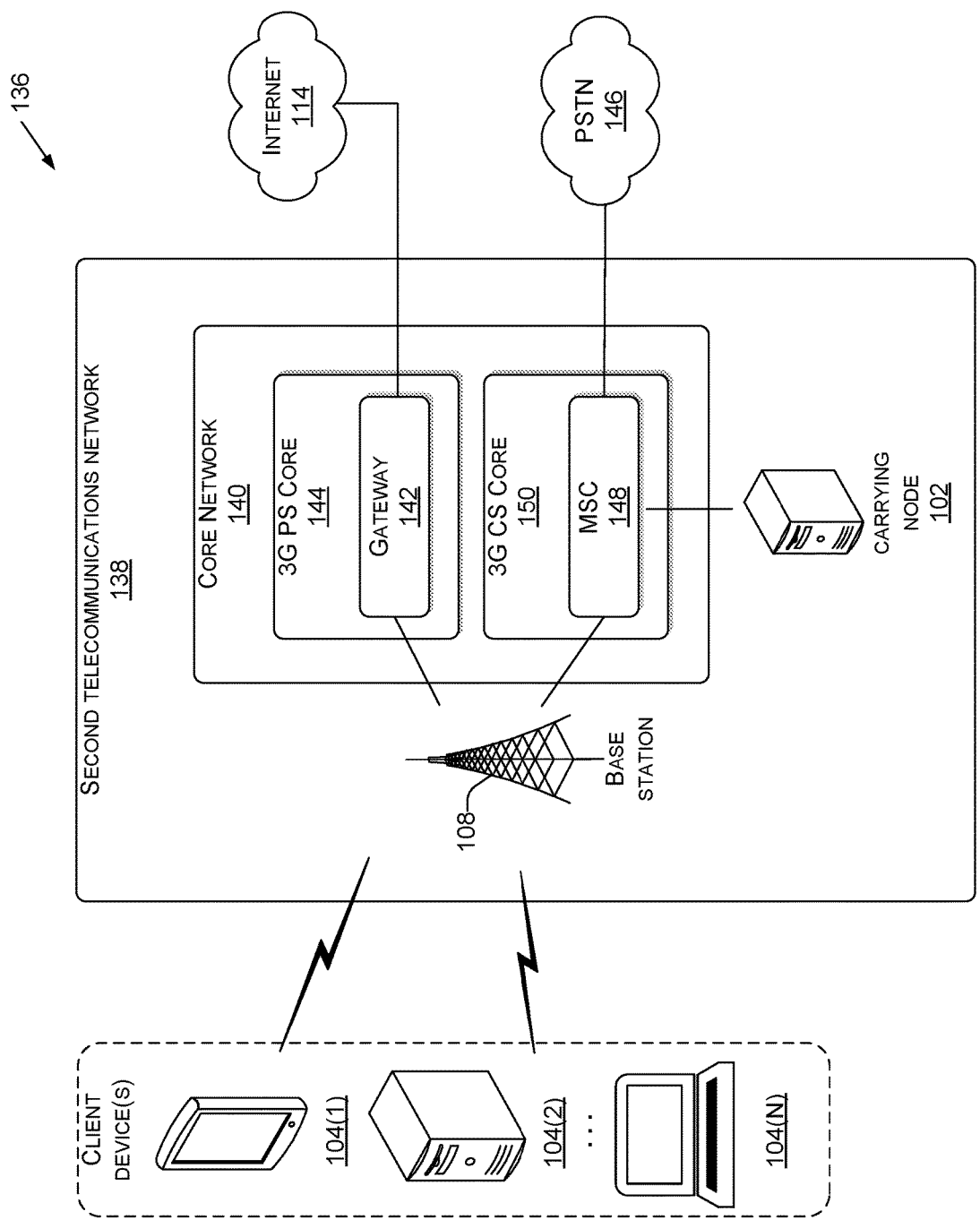

SELECTIVE ATTESTATION OF WIRELESS COMMUNICATIONS

BACKGROUND

Wireless communications networks reach large audiences. Networks may be manipulated by nuisance calls, such as robo-callers, that exploit the reach to large accessible audiences. Nuisance callers may manipulate mobile networks through a process known as identification spoofing (or "ID spoofing") in an attempt to increase the likelihood that the recipient will answer the nuisance call. In some instances, ID spoofing uses a local number or impersonates a familiar number. Telecom providers would like to prevent nuisance calls and increase the satisfaction of customers. Additionally, illegitimate spoofing can evolve to evade mitigation techniques, and integration of new technologies into established Voice over Internet Protocol (VoIP) networks imposes interoperability and interworking challenges.

Most wireless communications pass through one or more telecommunication providers before they are delivered to a recipient's device. Each provider handoff may be incomplete, where data necessary to determine the validity of a call, a process called wireless communication attestation, is lost so that at least one telecom in the chain cannot determine the authenticity of the originating source.

Mobile providers have deployed a set of technology standards called Secure Handling of Asserted information using toKENs ("SHAKEN") and Secure Telephony Identity Revisited ("STIR"). The complimentary STIR/SHAKEN standards guide mobile telecom providers implementation of attestation processes to synchronize cross network handoff of information. STIR/SHAKEN uses digital certificates, based on public key cryptography techniques, to ensure the calling telephone call is valid. Under STIR/SHAKEN each wireless communication service provider uses a trusted certificate authority source to verify the calling number is authentic.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 1B illustrates a schematic view of a second computing environment for operation of a selective attestation of an originating caller based in part on an AOCN or OCN associated with a destination client device.

DETAILED DESCRIPTION

Figure 1A:
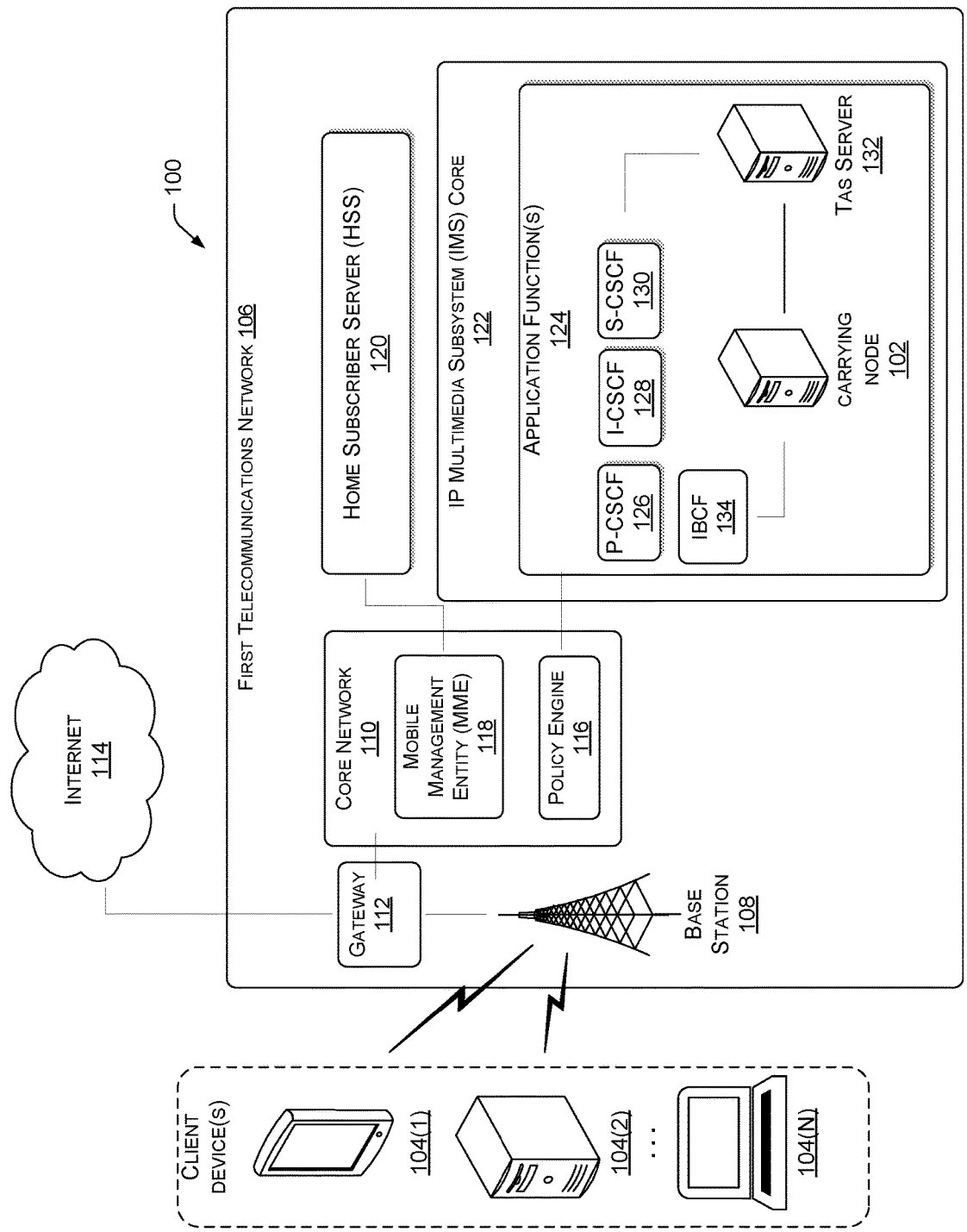
FIG. 1A illustrates a schematic view of a computing environment for operations of a selective attestation system to verify the identity of the originating caller based on the administrative operator carrier number (AOCN) or operator carrier number (OCN) of the network associated with the destination client device.

This disclosure is directed to systems and methods that facilitate identity attestation of an originating client device at a carrying node based at least in part on the AOCN or OCN associated with a telecommunication network of the destination device (i.e. destination network). The carrying node may be a trusted carrying node or a public carrying node. In one example, the carrying node may be part of a telecommunication network associated with the originating device (i.e. originating network). In another example, the carrying node may be remote, but communicatively connected to the originating network. An originating client device may initiate a wireless communication (i.e., place a call) at the originating network that is intended for delivery to a destination device within destination network. This disclosure describes techniques for the originating network to selectively verify an identity of the originating client device and provide such verification to the destination network, provided the destination network is part of the STIR/SHAKEN framework for end-to-end authentication and assertion of a telephone identity.

For example, the originating network may be configured to retrieve an AOCN or an OCN associated with the destination network, and in using the AOCN or OCN, verify that the destination network is part of the STIR/SHAKEN framework. In response, to verifying that the destination network is part of the STIR/SHAKEN framework, the originating network may provide an identity verification of the originating client device via a process known as call attestation. The client device may be associated with a telephone number or other identifier and associated with an AOCN or OCN via the telephone identifier and a Number Portability Administration Center (NPAC) database or Local Exchange Routing Guide (LERG) database. The AOCN and OCN correspond to network identifiers used to identify a telecommunications network. Even though throughout this disclosure the AOCN and OCN have been used exclusively to identify a destination network associated with a wireless communication, variations and modifications can be made such that alternate network identifiers may be used to identify the destination network.

In various examples, a wireless communication may be initiated at an originating network associated with the originating device or some other network (i.e., a "remote network"), collectively "peer networks". Wireless communications may travel from the originating network to the destination device through one or more carrier networks (i.e. intermediary telecommunications network between the originating network and the destination network) including both the home network and remote networks. Each carrier network may modify the wireless communication to include features (i.e. identity descriptors) within a session initiation protocol (SIP) message. The SIP message is responsible for initiating, maintaining, and terminating a wireless communication between the originating device and the destination device(s). Features included within a SIP message may include call attestation information that is intended to verify an identity of the originating device. In one example, call attestation information may be inserted into an identity header of a session protocol (SIP) INVITE message and sent to the destination network as part of establishing the wireless communication.

In order to improve the handoff of a call between multiple peer networks, methods and systems are needed to verify and attest to the identity of the originating client device. More specifically, when a wireless communication is initiated on an originating network, methods and systems are described for verifying that a destination network is part of the STIR/SHAKEN framework, based on the destination network AOCN or OCN, and as a result of the verifying, provide attestation for the identity of the originating client device. The systems and techniques described herein may be implemented in a number of ways. Several exemplary implementations are provided below with reference to the following FIGS. 1-6.

The techniques described herein are configured to be implemented within the Signature-based Handling of Asserted information using toKENs (SHAKEN) framework. Specifically, the SHAKEN framework is targeted at telecommunication service providers delivering phone calls over Voice over Internet Protocol (VoIP) and providing an end-to-end architecture for the authentication and assertion of a telephone identity by an originating service provider and the verification of the telephone identity by a terminating service provider.

The term "SIP INVITE message" corresponds to a call request configured to initiate a dialog for establishing a voice communication, such as a VoIP communication, between at least a pair of client devices. The SIP INVITE message may include a P-asserted identity header which conveys the proven identity of the originator of the SIP INVITE message within a trusted network. The P-asserted identity header has meaning within a trusted network framework by mutual agreement on the requirements for its use by the telecommunication network involved. The trusted network framework may correspond to the STIR/SHAKEN framework described earlier with reference to providing end-to-end architecture for authentication and assertion of a telephone identity.

Further, the term "techniques," as used herein, may refer to system(s), method(s), computer-readable instruction(s), module(s), algorithms, hardware logic, and/or operation(s) as permitted by the context described above and through the document.

Selective Attestation Embodiments

FIG. 1A illustrates a schematic view of a first computing environment 100 for operations of a carrying node 102 that is configured to selectively verify whether a destination telecommunications network is part of the STIR/SHAKEN framework based at least in part on the AOCN or OCN of the destination network. In doing so, the carrying node 102 may facilitate the first telecommunications network 106, albeit the originating network of a wireless communication, to verify the identity of an originating client device(s) 104(1)-104(N) pursuant to the STIR/SHAKEN framework. The first telecommunications network 106 of the first computing environment 100 corresponds to a Long-Term Evolution (LTE) telecommunications network. In the illustrated example, the first telecommunications network 106 is associated with originating client device(s) 104(1)-104(N) that initiate a wireless communication with a destination client device associated with a destination telecommunications network (not shown). The first telecommunications network 106 may include base station(s) 108 and a core network 110. The base station(s) 108 are responsible for handling voice and data traffic via air interfaces between the core network 110 and the originating client device(s) 104(1)-104(N). The core network 110 may provide telecommunication and data communication services to multiple client devices such as an LTE-compatible client device collectively referred to as originating client device(s) 104(1)-104(N).

In some embodiments, a gateway 112 may interface between the core network 110 and the internet 114. The gateway 112 may include one or more servers and related components that are tasked with providing connectivity between the core network 110 and the internet 114. More specifically, the gateway 112 may act as a point of entry and exit for network traffic into the first telecommunications network 106.

Additionally, the core network 110 may further include a policy engine 116 and a Mobile Management Entity (MME) 118. The policy engine 116 may enable detection of communication service data flow and provide parameters for policy control and/or charging control. The MME 118 performs signal functions in the core network 110. The MME 118 may be further configured to send and receive signaling information needed to set up, bill, and address calls to the base station(s) 108 and contains security protocols for authentication and authorization.

The MME 118 may access a Home Subscriber Server (HSS) 120. The HSS 120 is a main subscriber data base that provides details of network subscribers to other entities, such as the MME 118, within a telecommunications network. The MME 118 may access the HSS 120 to verify an identity, and subscriber details, of the originating client device(s) 104(1)-104(N) that is initiating a wireless communication with another client device within a destination network.

In various examples, an IP Multimedia Subsystem (IMS) core 122 may reside within the first telecommunications network 106. The IMS core 122 may include application function(s) 124, such as a Proxy Call Session Control Function (P-CSCF) 126, an Interrogating Call Session Control Function (I-CSCF) 128, and a Serving Call Session Control Function (S-CSCF) 130, and a Telephone Application Server (TAS) 132, an Interconnection Border Control Function (IBCF) 134. The P-CSCF 126 behaves like a proxy by accepting requests and serving them internally or forwarding them towards to the I-CSCF 128 and S-CSCF 130. The S-CSCF 130 acts as a Session Initiation Protocol (SIP) registrar and in some cases as a SIP redirect server. The S-CSCF 130 is responsible for processing the location registration of a client device, client authentication, call routing, and processing. The I-CSCF 128 is tasked with selecting an S-CSCF 130 for serving an initial SIP request, particularly when a client device initiating the request does not know which S-CSCF 130 should receive the request. The IBCF 134 is a network element deployed to protect the first telecommunications network 106, The IBCF 134 may provide the first telecommunications network 106 with measurements, access control, and data conversion facilities of communications received at the network edge.

The TAS 132 may be configured to emulate calling features traditionally provided by a Public Switched Telephone Network (PSTN) or a legacy PLMN (i.e. 2G or 3G), such as call forwarding, voicemail, conference bridges, and/or so forth. The TAS 132 may further facilitate establishing a VoIP communication between originating client device(s) 104(1)-104(N). In some examples, the TAS 132 may be further configured to insert an attestation parameter into a SIP INVITE message generated by an originating client device (i.e. client device) 104(1)-104(N), in accordance with the STIR/SHAKEN framework.

Further, the carrying node 102 may be communicatively connected to the TAS 132, IBCF 134, or CSCF, and detect receipt of a SIP INVITE message at the TAS 132 that is associated with a wireless communication initiated by an originating client device 104(1)-104(N). In doing so, the carrying node 102 may retrieve the AOCN or OCN of the destination network associated with the wireless communication, and further verify whether the destination network is part of the STIR/SHAKEN framework.

In response to verifying that the destination network is part of the STIR/SHAKEN framework, the carrying node 102 may facilitate the TAS 132, IBCF 134, or CSCF in verifying an identity of the originating device, and in doing so, generate an attestation certificate for insertion into the SIP INVITE message The TAS 132 may interact with the I-CSCF 128 and S-CSCF 130 to route the modified SIP INVITE message to the destination network associated with the destination device.

While this disclosure describes the carrying node 102 as part of the IMS core 122 of the first telecommunications network 106, further variations and modifications can be made such that the carrying node 102 is remotely executable on a separate server or a separate computing device, by the TAS 132, IBCF 134, or CSCF. One of ordinary skill in the art would appreciate that such an embodiment remains within the scope of the invention, as defined in the appended claims.

Generally, a wireless communication session may be initiated at a first telecommunications network 106, by a request from an originating client device(s) 104(1)-104(N) to initiate a session with a destination device. The first telecommunications network 106 may then relay the request, and subsequently the communication, through the internet 114 to a destination network and destination device or recipient. In some instances, the first telecommunications network 106 may provide attestation information for the identity of the originating device 104, based at least in part on verifying that the destination network is part of the STIR/SHAKEN framework. Attestation information improves the likelihood that the request to initiate a communication session between the originating client device 104(1)-104(N) and the destination client device will be completed at the destination device.

In one embodiment, the first telecommunication network 106 associated with the originating client device 104 may initiate a request for verification of the AOCN or OCN associated with the destination network. Based on determining that the destination network is part of STIR/SHAKEN framework, based at least in part on the AOCN or OCN, the first telecommunication network 106 may cause attestation of the originating device 104. In one instance, the request for AOCN or OCN validation may be initiated by the CSCF of the application functions 124 to the carrying node 102. In another embodiment, the request for AOCN validation or OCN validation may be made by the IBCF 134 to the carrying node 102.

In some embodiments, the carrying node 102 may receive a request to validate the AOCN or OCN associated with the destination network, determine whether the destination network is a party to the STIR/SHAKEN framework, and in doing so, cause an attestation certificate associated with the identity of the originating client device 104 to be generated and transmitted to the IBCF 134 for delivery to the destination network. The attestation certificate may be a SIP INVITE header certificate to be incorporated into the header of the SIP INVITE message.

The carrying node 102 may interrogate a database associated with the destination network, the destination network being associated with one of an AOCN or OCN. The AOCN or OCN may act as an identifier for validating that the destination network is "whitelisted" as having deployed the STIR/SHAKEN framework for end-to-end authentication and assertion of a telephone identity. Where the AOCN or OCN is a whitelisted network, the carrying node 102 may facilitate verification of the identity of the originating client device 104 and generate an attestation certificate, pursuant to the STIR/SHAKEN framework. If the AOCN or OCN is not whitelisted the carrying node 102 may cause the attestation request to be rejected. In other instances, the carrying node 102 may optionally cause an attestation certificate to be generated and optionally incorporated into the SIP INVITE message.

FIG. 1B illustrates a second computing environment 136 that facilitates an operation of the carrying node 102 within a second telecommunications network 138. The second telecommunications network 138 may correspond to a 3G telecommunications network and include a core network 140. The core network 140 may further include 3G domain components that support 3G data traffic and 3G voice traffic. For example, 3G data traffic between a 3G-compatible, client device(s) 104(1)-104(N) and the internet 114 may be routed through one or more gateway(s) 142 of a 3G Packet Switch (PS) Core 144. Additionally, 3G voice traffic between the 3G-compatible, client device(s) 104(1)-104(N) and the Public Switched Telephone Network (PSTN) 146 may be routed through a Mobile Switch Center (MSC) 148 of the 3G Circuit Switch (CS) core 150. The MSC 148 is configured to control the network switching subsystem of the second telecommunications network 138. The network switching subsystem carries out call out and mobility management functions for client device(s) 104(1)-104(N).

In this example, the MCS 148 may be configured to interact with the carrying node 102 within the second telecommunications network 138, described earlier with reference to FIG. 1A. While this disclosure describes modifying the MSC 148 to interact with the carrying node 102, further variations and modifications can be made such that the call attestation carrying node 102 is remotely executable on a separate server or a separate computing device by the MCS 148. One of ordinary skill in the art would appreciate that such an embodiment remains within the scope of the invention, as defined in the appended claims.

Figure 2:
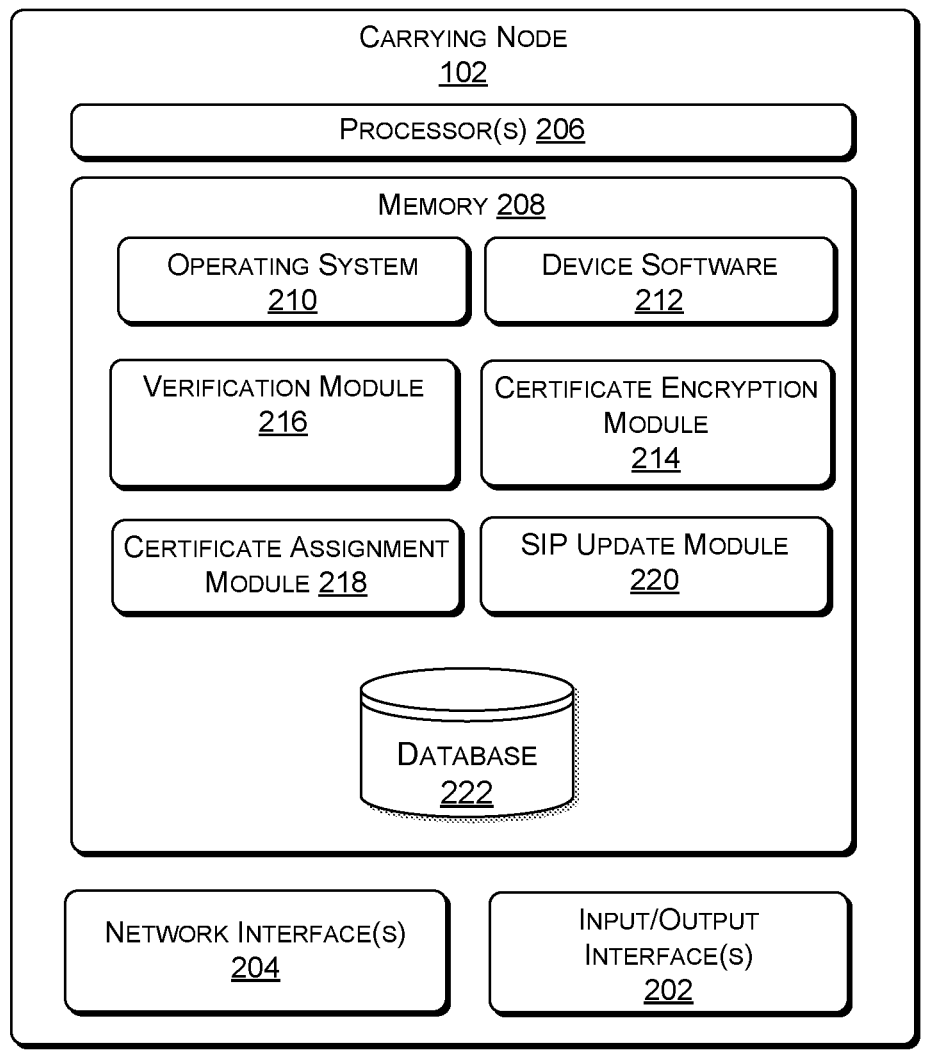
FIG. 2 illustrates a block diagram of various components of the call attestation carrying node as incorporated within the TAS, IBCF, or CSCF.

FIG. 2 illustrates a block diagram of a representative carrying node 102 for verifying whether a destination network of a wireless communication is part of the STIR/SHAKEN framework, based at least in part on an AOCN or OCN of the destination network. The carrying node 102 is illustrative of a computing device in which aspects of the technology may be practiced. The computing device may be any type of general or specific purpose computing device, including for example, a client device such as a desktop computer. Further, the computing device may be a server, such as an application server, a virtual computing host, or a file server or network node.

The carrying node may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the carrying node 102 may include network interface(s) 204. The network interface(s) 204 may include any sort of transceiver known in the art. For example, the network interface(s) 204 may include a radio transceiver that performs the function of transmitting and receiving radio frequency communications via an antenna. In addition, the network interface(s) 204 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB). The network interface 204 may further include a wired network adapter, e.g., an Ethernet adapter, a Token Ring adapter, or a Digital Subscriber Line (DSL) adapter. The network interface(s) 204 may also include a wireless network adapter, for example, a Wi-Fi adapter, Bluetooth adapter, a Long-Term Evolution (LTE) adapter, or a 5G adapter.

The carrying node 102 may include at least one processor circuit 206 operably connected to memory 208 and configured to execute instructions for the execution of the carrying node functions, including for example, workloads and workload balancing, processes, or other technology. The processor may be a microprocessor, a microcontroller, a graphics processor, a coprocessor, a field programmable gate array, a programmable logic device, a signal processor, or any other circuit suitable for processing data. Moreover, the one or more processors 206 of the carrying node 102 and the memory 208 may implement the operating system 210 and the device software 212, and any of one or more applications necessary for executing the function of the carrying node 102. The memory 208 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Other examples may include double data rate (DDR) memory, or other dynamic random access memory (DRAM), High Bandwidth Memory (HBM), Hybrid memory Cube memory, 3D-stacked memory, static random access memory (SRAM), or any other memory comprised of one or more memory circuit integrated into one or more of a DIMM, SIMM, SODIMM, or other packaging.

In the illustrated example, the memory 208 may include an operating system 210, device software 212, a certification encryption module 214, a verification module 216, a certificate assignment module 218, a SIP update module 220, and a database 222.

The operating system 210 may include components that enable the carrying node 102 to receive and transmit data via various interfaces (e.g., user controls, network interface 204, and/or memory input/output devices). The operating system 210 may also process data using the one or more processors 206 to generate outputs based on inputs that are received via the network interface(s) 204. For example, the operating system 210 may provide an execution environment for the execution of the applications. The operating system 210 may further include a presentation component that presents the output (e.g., display the data on an electronic display, store the data in memory, transmit the data to another electronic device, etc.) at the input/output interface(s) 202.

The operating system 210 may include an interface layer that enables applications to interface with the network interface(s) 204 and/or a communication interface 236. The interface layer may comprise public APIs, private APIs, or a combination of both public APIs and private APIs. Additionally, the operating system 210 may include other components that perform various other functions generally associated with an operating system. The device software 212 may include software components that enable the carrying node 200 to perform functions. For example, the device software 212 may include basic input/output system (BIOS), Boot ROM, or a bootloader that boots up the carrying node 200 and executes the operating system 210 following power up of the device.

The database 222 of the carrying node 102 is stored on data storage memory for long-term, non-volatile data storage. Data storage memory may include any of nonvolatile memories, disks, disk drives, hard drives, solid-state drives, or any other media that can be used for the non-volatile storage of information.

The certificate encryption module 214 may encrypt or decrypt an attestation certificate. The encryption may use an encryption key. The key may be stored on the database 222 or any other trusted database that may be either publicly or privately available. In some instances, the attestation certificate may include an indication of the AOCN or OCN and/or one or more of: the wireless communication, the originating client device 104, or the destination client device so that the key may be recalled by a network participant (i.e., a trusted node on the network such as a wireless provider) and so that the attestation certificate may be verified at later stages in the transmission of the communication to peer networks.

In some embodiments, the certificate encryption module 214 may rely on an encryption algorithm common in the industry for such applications, including for example, Data Encryption Standard (DES), Triplets (3DES or TDES), one-way asymmetric encryption (RSA), Advanced Encryption Standard (AES), or other custom encryption algorithm. In some instances, encryption and decryption may rely on private or public blockchains. In still further instances the encryption algorithm may rely on a consensus algorithm such as: proof of work (PoW), proof of stake (PoS), proof of authority (PoA) Byzantine Fault Tolerance e(BFT), or similar method utilized in the art.

The verification module 216 maintains a record of whitelisted AOCNs and OCNs. In some instances, the verification module 220 maintains a dynamic database that compares one or more features of the destination AOCN or OCN and/or the destination client device to determine if the destination AOCN/OCN is a valid AOCN or OCN.

A verified AOCN or OCN in the database 222 is an AOCN or OCN of a telecommunications network determined to be deploying a STIR/SHAKEN framework for end-to-end authentication and assertion of a telephone identity. Where the AOCN or OCN is associated with a verified network, the carrying node 102 may facilitate a verification of the identity of the originating client device 104(1)-104(N) and generate an attestation certificate pursuant to the STIR/SHAKEN framework. If the AOCN or OCN is not verified the carrying node 102 may cause the attestation request to be rejected. In other instances, the carrying node 102 may optionally cause an attestation certificate to be generated and optionally incorporated into the SIP INVITE message.

The certificate assignment module 222 may generate a communication attestation certificate and may optionally encrypt the communication attestation certificate via the certificate encryption module 214.

The SIP update module 224 may send instructions via a certificate update file or instruction to trigger the inclusion of an attestation certificate into a SIP INVITE message of a wireless communication. The certificate update instruction may be computer readable code or instructions executed at the first telecommunications network 106 or the second telecommunications network 138. The attestation certificate may be added to a header of the SIP INVITE message of the wireless communication in the outgoing SIP INVITE message towards the network of the destination client device. In some instances, the attestation certificate may be encrypted. In still further instances the attestation certificate may be an unencrypted attestation certificate.

Figure 3:
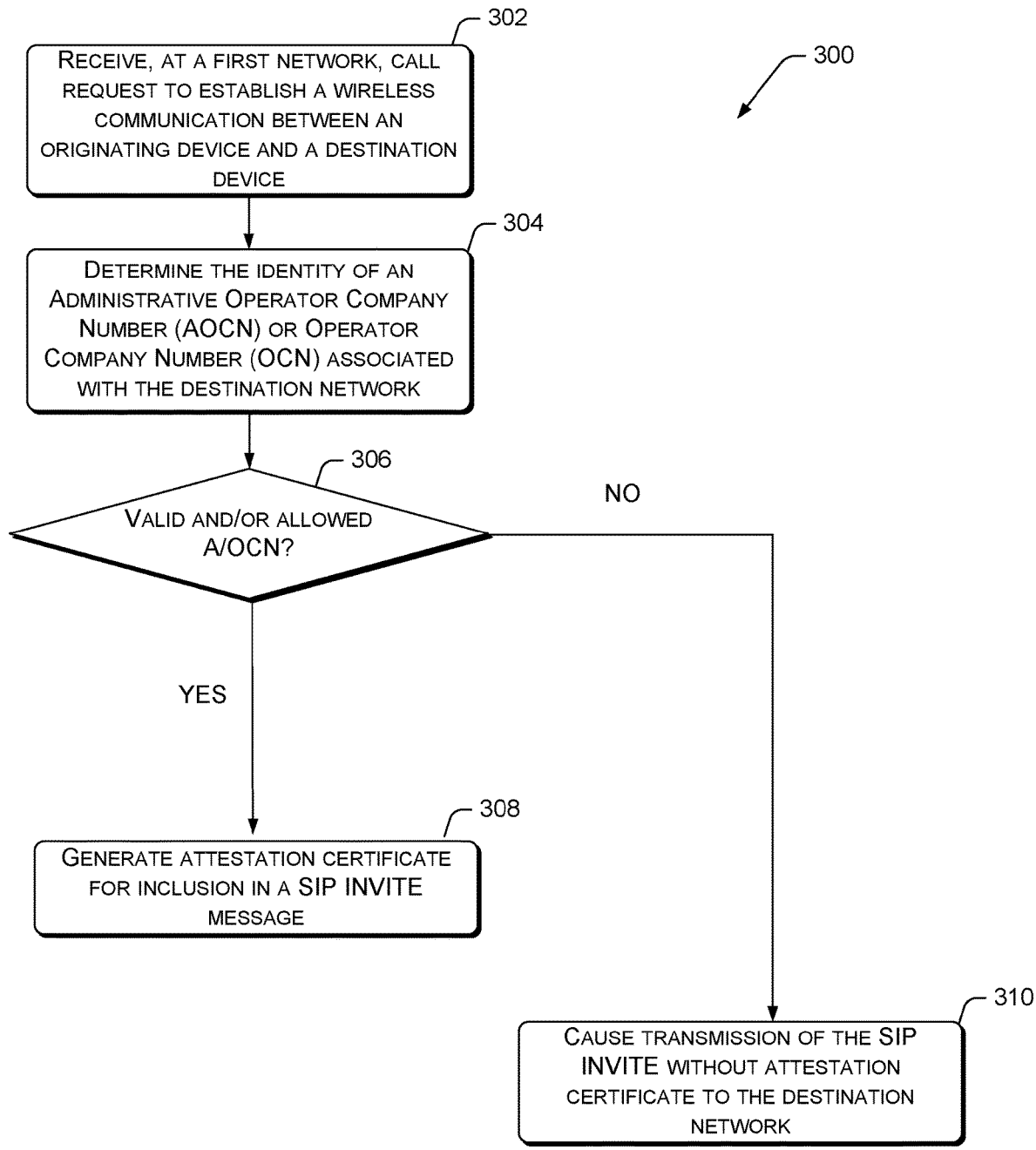
FIG. 3 illustrates a block diagram of an example method for call attestation through a number of characteristics of the wireless communication.

FIG. 3 presents a process 300 that relates to operations of the call attestation carrying node 102. Process 300 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 300 is described with reference to the computing environments of FIGS. 1A and 1B.

FIG. 3 illustrates a process that facilitates generating an attestation certificate in response to verifying that a destination network is part of the STIR/SHAKEN framework, based at least in part on a valid or allowed AOCN or OCN. In one example, the originating network may correspond to SIP network, such as an LTE telecommunication network. In another example, the originating network may correspond to a non-SIP network, such as a 2G or 3G telecommunication network. In each example, however, a carrying node may interact with each telecommunications network to determine whether a destination network is part of the STIR/SHAKEN framework.

At step 302 an originating network may receive, via a SIP INVITE, a request to establish a wireless communication between an originating client device and a destination client device. The originating network may initiate an attestation process consistent with a STIR/SHAKEN framework to provide end-to-end authentication and assertion of a telephone identity. The request for attestation may be received at the carrying node 102 of the telecommunication network.

Prior, contemporaneously, or subsequent to attestation of the originating client device 104, the call attestation carrying node 102 may determine an administrative operator carrier number (AOCN) or operator carrier number (OCN) associated with the destination client device at step 304. The call attestation carrying node 102 may interrogate a database associated with the destination network, the destination network being associated with one of an AOCN or OCN.

The carrying node 102 may determine that the destination network is part of the STIR/SHAKEN framework, based at least in part on a valid or allowed AOCN or OCN at step 306. For example, the carrying node 102 may cause the interrogation of a database including a list of whitelisted AOCN or OCNs to determine that the destination network is part of the STIR/SHAKEN framework. If the destination network is determined to be part of the STIR/SHAKEN framework, the carrying node 102 may cause an attestation certificate to be generated at step 308. More specifically, the attestation certificate may be a feature of the SIP identity header wherein the attestation certificate may be incorporated into the SIP identity header associated with the wireless communication. In one embodiment, a valid AOCN or OCN is one that has been verified as being a part of the STIR/SHAKEN framework that provides an end-to-end architecture for authentication and assertion of a telephone identity.

At step 308, the call attestation carrying node 102 may generate or cause the generation of an attestation certificate associated with the identity of the originating client device 104. The attestation certificate may be an alphanumeric certificate, computer readable code or instructions, or similar format that is recognized within the STIR/SHAKEN framework.

If the call attestation carrying node 102 does not determine that the AOCN or OCN is a valid carrier number, the call attestation carrying node 102 may optionally cause the transmission of the SIP INVITE to the destination network without an attestation certificate at step 314.

Figure 4:
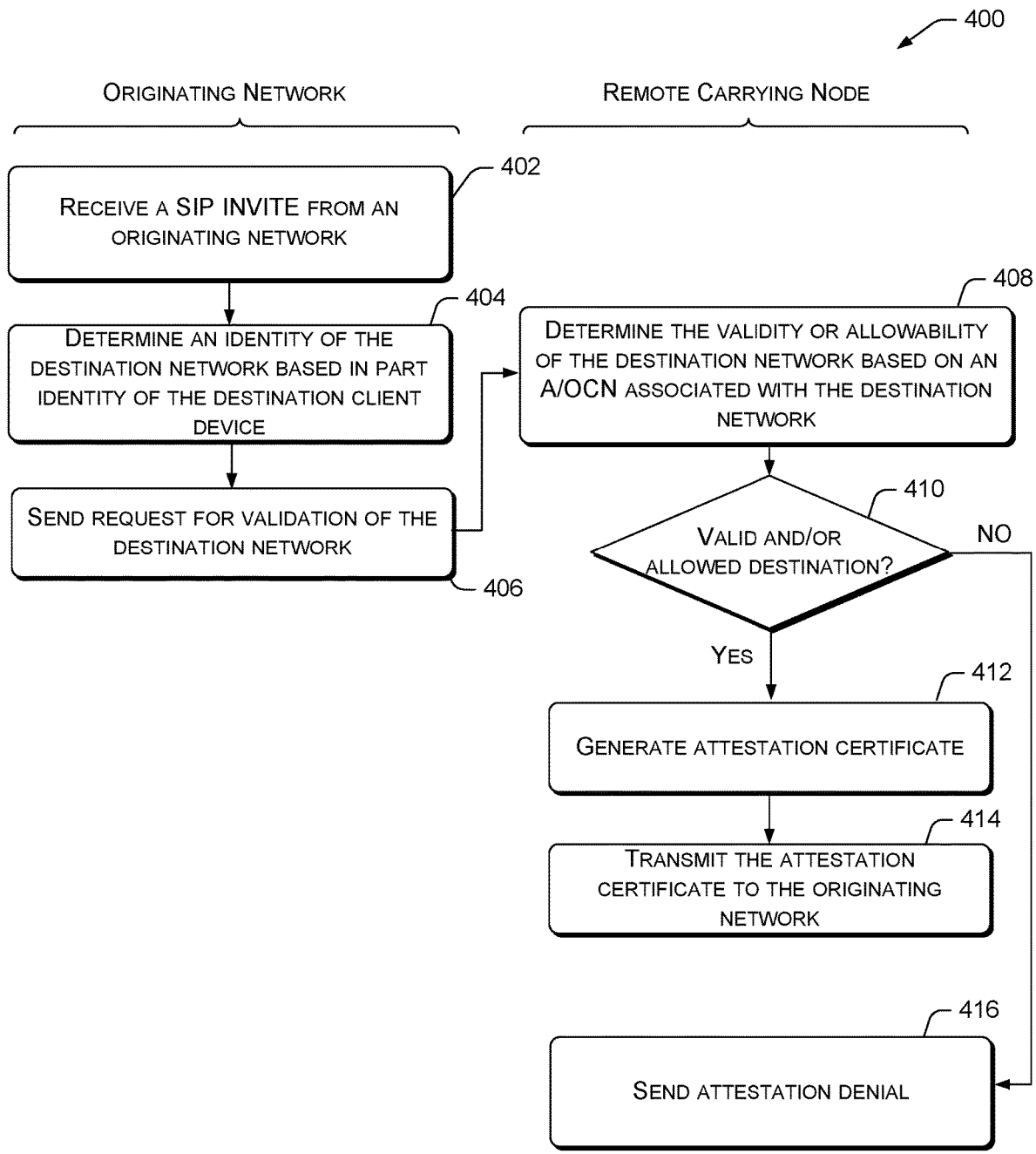
FIG. 4 illustrates a method for generating a wireless communication attestation certificate and causing the certificate to be associated with the wireless communication.

FIG. 4 presents a process 400 that relates to operations of the carrying node 102. Process 400 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 400 is described with reference to the computing environments of FIGS. 1A and 1B.

FIG. 4 illustrates a process 400 for generating an attestation certificate at a carrying node 102 that is external to the originating network.

At step 402, the originating network receives a request to establish a wireless communication via a SIP message including a SIP INVITE message from an originating service provider. The originating network may determine the identity of the destination network associated with the destination client device at step 404. The identity of the destination network may be associated with the AOCN or OCN of the destination network.

At step 406 the originating network may send a request for validation of the AOCN or OCN associated with the destination network to the remote carrying node. The remote carrying node may be a call attestation carrying node 102. In some embodiments, the request may be for the validation of the AOCN or OCN associated with the destination network.

The validity of the destination network AOCN or OCN is determined at step 408. The AOCN or OCN is determined to be valid or invalid when included in a database having a list of "whitelisted" or "blacklisted" AOCN or OCNs, respectively. Whitelisted AOCN or OCNs may be considered valid AOCN or OCNs at the validation step 408. In one instance, verifying the AOCN or OCN includes comparing the carrier number associated with the destination client device identifier (e.g., wireless phone number) is included within a list of permissible carrier numbers (e.g., whitelisted carriers). In still other instances, whitelisted AOCN or OCNs may represent partner networks associated with the originating network. In one embodiment, a destination network is a valid or permissible network if the AOCN or OCN associated with the destination client device is identified as a network having a STIR/SHAKEN framework that provides an end-to-end architecture for authentication and assertion of a telephone identity.

Where a destination network is determined to be a valid network at 410, the remote carrying node may initiate the generation of an attestation certificate associated with the identity of the originating client device 104 at step 412. In some instances, the attestation certificate may be an alphanumeric certificate, computer readable code or instructions, or similar format that is recognized within the STIR/SHAKEN framework alphanumeric.

The attestation certificate may be transmitted to the originating network at step 414. Specifically, the attestation certificate may be routed to TAS 132, IBCF 134, ISBC, or CSCF 130 within an LTE network or an MSC 148 within a 2G or 3G network.

The originating network may receive the attestation certificate and incorporate the certificate, or another attestation parameter associated with the identity attestation of the originating client device into the SIP INVITE associated with the wireless communication.

If, at step 410, the remote carrying node does not validate the AOCN or OCN of the destination network the remote carrying node may send an attestation denial message to the originating network at step 416. In one instance, the remote carrying node may determine that the destination network is not validated, or a non-verified wireless carrier, based at least in part on the carrier number (AOCN/OCN) not being included within the list of permissible carrier numbers. The originating network may revive the attestation denial and determine to optionally send the SIP INVITE to the destination network without an attestation certificate. In some embodiments, the originating network may have discretion to terminate the requested communication based at least in part on receipt of an attestation denial from the remote carrying node.

Figure 5:
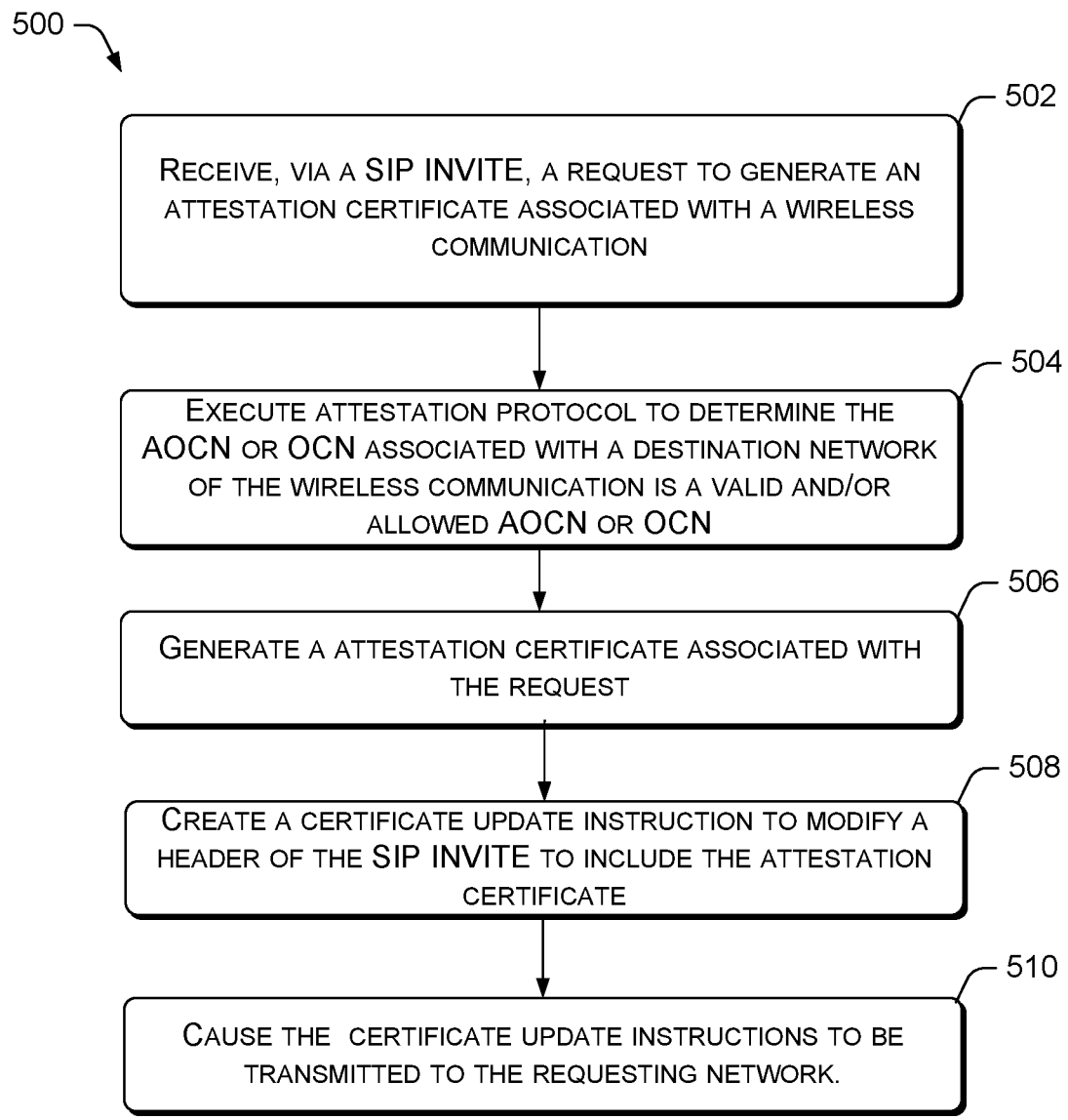
FIG. 5 illustrates a method for generating an attestation certificate and modifying a SIP INVITE message.

FIG. 5 presents a process 500 that relates to operations of the call attestation carrying node 102. Process 500 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 500 is described with reference to the computing environments of FIGS. 1A and 1B.

FIG. 5 illustrates a process for generating an attestation certificate with an instruction to modify the SIP INVITE message to include the attestation certificate at a requesting network. The instruction to modify the SIP INVITE is executed when the AOCN or OCN of the destination network is determined to be a valid AOCN or OCN.

At step 502, a SIP INVITE is received at the originating telecommunication network, the SIP INVITE initiating a request to generate an attestation certificate associated with a wireless communication between a first client device and a second client device. In one instance, the request is received at a first telecommunications network 106 for attestation of the identity of an originating client device.

At 504, a call attention carrying node 102 may execute an attestation protocol to attest for the identity of the originating client device. The attestation protocol may first verify the AOCN or OCN of the destination network associated with the destination client device.

In some instances, the destination client device may be associated with an AOCN or multiple OCNs. In one embodiment, the call attestation carrying node 102 may generate an attestation certificate associated with the request in response to a determination that the destination network is a valid wireless communication network. The call attestation carrying node 102 may determine the AOCN or OCN associated with the destination network to be valid based at least in part on an interrogation of a database of verified networks. A verified network is a network has deployed a STIR/SHAKEN framework for end-to-end authentication and assertion of a telephone identity.

For instance, the destination network's AOCN or OCN may be included in a database having a list of "whitelisted" or "blacklisted" AOCN or OCNs. Whitelisted AOCN or OCNs may be considered verified AOCN or OCNs at the validation step 504. In some instances, whitelisted AOCN or OCNs may represent partner networks to the originating network.

At step 506, as a result the call attestation carrying node 102 determining that the AOCN or OCN of the destination network is a valid or allowed AOCN or OCN, the call attestation carrying node 102 may generate an attestation certificate. In some embodiments the attestation certificate is unique to the request. The certificate may include an indicator associated with the originating client device and/or the originating network associated with the originating client device. In some embodiments, the certificate may include an indicator associated with the destination client device or destination network associated with the destination client device.

In still further embodiments, the certificate may be an encrypted with an encryption key that is either private and/or publicly available. The encryption key may be used by a subsequent wireless communication network to verify the attestation certificate of the wireless communication. Where the encryption key is a public encryption key, the destination wireless network may retrieve the encryption key from a publicly accessible database. In still further embodiments, the encryption key is a private encryption key and may be retrieved only from a trusted network. For example, a trusted network may be on the list of whitelisted AOCN or OCNs. In still further instances, the trusted network may be a partner network or an OCN associated with an AOCN.

In some embodiments, the encrypted certificate may rely on an encryption algorithm common in the industry for such applications, including for example, Data Encryption Standard (DES), TripleDES (3DES or TDES), one-way asymmetric encryption (RSA), Advanced Encryption Standard (AES), or other custom encryption algorithm.

At step 508, the call attestation carrying node 102 may generate a certificate update instruction to modify a header of the SIP INVITE associated with the wireless communication to include the attestation certificate. In some instances, the certificate update file may insert the attestation certificate into the SIP identity header of the wireless communication. The inserted certificate may be encrypted or decrypted. In some instances, the certificate may include both an encrypted portion and a decrypted portion. In still other embodiments, two certificates may be generated one encrypted certificate and one certificate having no encryption features.

At step 510, the carrying node 102 may transmit computer-executable instructions to cause a certificate database to be updated to include at least an identifier associated with the generated attestation certificate. In other embodiments, the certificate database includes an encrypted or unencrypted attestation certificate. In one example, the certificates stored in the attestation database may include an indication of one or more of the originating network's AOCN or OCN, the destination network's AOCN or OCN, an identifier associated with the originating client device, or an identifier associated with the destination client device.

In still further embodiments, the database may be located at the carrying node 102. The database may alternatively be located on a trusted network or a publicly accessible database.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more processors:
receiving, from a first wireless communication network, a request to establish a communication session between a first device and a second device, the first device being associated with a first device identifier and the second device being associated with a second device identifier;
determining an identity of a second wireless communication network associated with the second device based at least in part on the second device identifier;
verifying, based at least in part on the identity of the second wireless communication network, whether the second wireless communication network is operated by an approved wireless carrier with a carrier number included within a list of permissible carrier numbers;
in response to determining that the second wireless communication network is operated by the approved wireless carrier, generating an attestation certificate associated with the first device identifier; and
transmitting, the attestation certificate to the first wireless communication network for delivery to the second wireless communication network.

2. The computer-implemented method of claim 1, wherein determining the identity of the second wireless communication network further includes comparing the second device identifier with a list of device identifiers and associated carrier numbers identifying the second wireless communication network.

3. The computer-implemented method of claim 2, wherein the carrier numbers are one or more of: an Administrative Operator Carrier Number (AOCN) or Operator Carrier Number (OCN).

4. The computer-implemented method of claim 1, wherein the carrier number is associated with the second device identifier.

5. The computer-implemented method of claim 1, wherein the list of permissible carrier numbers is verified as associated with wireless carriers deploying a STIR/SHAKEN framework for end-to-end authentication and assertion of a telephone identity.

6. The computer-implemented method of claim 2, wherein the list of device identifiers and associated carrier numbers identifying the second wireless communication network is hosted on a number portability database.

7. The computer-implemented method of claim 1, further comprising:
determining that the second wireless communication network is operated by a non-verified wireless carrier, based at least in part on the carrier number not being included within the list of permissible carrier numbers.

8. The computer-implemented method of claim 1, wherein the second device identifier is one of a mobile phone number, universal device identifier, advertising identifier, device serial number, or media access control address.

9. A network server of a first network, comprising:
one or more processors;
memory coupled to the one or more processors, the memory having one or more modules stored therein, the one or more modules executable by the one or more processors to:
receive, from a first device associated with a first wireless carrier, a communication request to establish a communication between the first device and a second device;
interrogate a database to determine a carrier identifier associated with a second wireless carrier of the second device;
determine, based at least in part on the carrier identifier, whether the second wireless carrier is an approved wireless carrier, the carrier identifier included in a list of permissible carrier identifiers;
in response to determining that the second wireless carrier is the approved wireless carrier, verify an identity of the first device;
generate an attestation certificate; and
transmit the attestation certificate to the first wireless carrier for delivery to the second wireless carrier.

10. The network server of claim 9, wherein the communication request is a SIP INVITE message and the one or more modules are further executable by the one or more processors to:
generate computer executable code that when executed causes the generation of a modified SIP INVITE message configured to initiate the communication between the first device and second device, wherein, the modified SIP INVITE message includes the attestation certificate.

11. The network server of claim 9, wherein the carrier identifier comprises one or both of an administrative operator carrier number (AOCN) or an operator carrier number (OCN) and the list of permissible carrier identifiers comprises a list of whitelisted AOCNs or OCNs.

12. The network server of claim 11, wherein the list of permissible carrier identifiers are carrier identifiers associated with wireless carriers verified as deploying a STIR/

SHAKEN framework for end-to-end authentication and assertion of a telephone identity.

13. The device of claim 9, wherein verifying the identity of the first device includes determining a device identifier of the first device, the device identifier being one of a mobile phone number, universal device identifier, advertising identifier, device serial number, or media access control address.

14. The device of claim 9, wherein the carrier identifier is one of an administrative operator carrier number, operator carrier number, or both an operator carrier number and an administrative operator carrier number.

15. The network server of claim 9, wherein the first wireless carrier corresponds to a SIP network, and wherein the attestation certificate is transmitted to a Telephony Application Server (TAS) or Interconnection Border Control Function (IBCF).

16. The network server of claim 9, wherein the first wireless carrier corresponds to a non-SIP network, and wherein the attestation certificate is transmitted to a Mobile Switching Center (MSC).

17. One or more non-transitory computer-readable media of a network device storing computer-executable instructions that upon execution cause one or more processors to perform acts comprising:

receiving, from a first telecommunications network, a request for attestation of an identity associated with a first device, the request resulting from a SIP INVITE message initiated by the first device to create a communication session between the first device and a second device;

executing an attestation protocol to determine a network identifier associated with a second telecommunications network of the second device;

determining, based on the network identifier, that the second telecommunication network is a valid telecommunications network, the network identifier included in a list of permissible network identifiers;

generating an attestation certificate according to the attestation protocol, the attestation certificate associated with the identity of the first device; and inserting the attestation certificate in the SIP INVITE message to be transmitted to the second telecommunications network.

18. The one or more non-transitory computer-readable media of claim 17, wherein the valid telecommunications network is verified as deploying a STIR/SHAKEN framework for end-to-end authentication and assertion of a telephone identity.

19. The one or more non-transitory computer-readable media of claim 18, wherein the acts further comprise initiating a communication session between the first device and the second device.

20. The one or more non-transitory computer-readable media of claim 17, wherein the network identifier is one or both of an administrative operator carrier number (AOCN) or an operator carrier number (OCN).

* * * * *